United States Patent
Rosado et al.

(10) Patent No.: US 10,291,111 B1
(45) Date of Patent: May 14, 2019

(54) FEEDBACK CONTROL FOR PARALLEL POWER CONVERTER SYNCHRONIZATION

(71) Applicant: Hamilton Sundstrand Corporation, Charlotte, NC (US)

(72) Inventors: Sebastian Rosado, Cork (IE); Virgilio Valdivia Guerrero, Roquetas de Mar (ES); Laura Albiol-Tendillo, Valls (ES)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 15/934,244

(22) Filed: Mar. 23, 2018

(51) Int. Cl.
*H02M 7/493* (2007.01)
*H02M 1/10* (2006.01)
*H02M 5/44* (2006.01)
*H02M 3/28* (2006.01)

(52) U.S. Cl.
CPC ............. *H02M 1/10* (2013.01); *H02M 3/285* (2013.01); *H02M 5/44* (2013.01); *H02M 7/493* (2013.01)

(58) Field of Classification Search
CPC . H02M 2001/0009; H02M 2001/0012; H02M 1/08; H02M 1/084; H02M 1/0845; H02M 7/42; H02M 7/44; H02M 7/4822; H02M 7/493; H02M 7/515; H02M 7/53; H02M 7/537; H02M 7/539; H02M 7/5395; H02J 3/38
See application file for complete search history.

(56) References Cited

U.S. PATENT DOCUMENTS

| 5,657,217 | A | * | 8/1997 | Watanabe | ............... H02M 7/49 363/71 |
|---|---|---|---|---|---|
| 6,917,271 | B2 | | 7/2005 | Zhang et al. | |
| 9,257,934 | B2 | | 2/2016 | Hamada et al. | |
| 9,450,479 | B2 | | 9/2016 | Basic et al. | |
| 9,473,021 | B2 | | 10/2016 | Hsiao et al. | |
| 2012/0187929 | A1 | * | 7/2012 | Ohshita | ............... H02M 3/1584 323/272 |
| 2018/0166988 | A1 | * | 6/2018 | Yonezawa | ............. H02M 3/156 |

\* cited by examiner

*Primary Examiner* — Gary L Laxton
(74) *Attorney, Agent, or Firm* — Kinney & Lange, P.A.

(57) ABSTRACT

A system and method includes parallel power converters, at least one current sensor, and a first feedback control circuit. A first power converter is configured to convert a first input power to a first output power, and is controlled using pulse width modulation having a first switching period. One or more second power converters are connected in parallel with the first power converter and configured to convert a second input power to a second output power. The first output power and the second output power are provided to a load. The at least one current sensor is positioned to sense first output current of the first output power, and the first feedback control circuit is configured to calculate a first metric based on the first sensed current at each of a plurality of first edges of each half switching period of the first switching period, and at intermediate points between each of the plurality of first edges. The first feedback control circuit is configured to adjust the first switching period based upon the first metric.

19 Claims, 6 Drawing Sheets

FEEDBACK CONTROL FOR PARALLEL POWER CONVERTER SYNCHRONIZATION

BACKGROUND

The present invention relates generally to power converters, and in particular to a system and method for synchronizing parallel power converters.

Power converters are used to convert an input power from a power source into an output power suitable for a load. For example, a load may require three-phase alternating current (AC) power to operate, but the power bus may provide direct current (DC) power. In order to power the load, a power converter must be implemented to convert the DC power from the power bus into the three-phase AC power for the load.

In some systems, it is desirable to provide power to a load from multiple converters. When two or more power converters are connected in parallel, additional current paths are created. This can result in current recirculation, which is undesirable in that it increases current components at various frequencies (e.g., ripple) within the converters and decreases conversion efficiency. To accommodate higher current peaks, components may be oversized during design of the converter. Large recirculating currents could also decrease performance, increase stress on the devices which may reduce the lifetime of the converter, and in some cases even damage components of the converter. It is desirable to efficiently eliminate recirculation current without the need for additional, costly, components or oversized devices.

SUMMARY

A system includes parallel power converters, at least one current sensor, and a first feedback control circuit. The first power converter is configured to convert a first input power to a first output power, and is controlled using pulse width modulation having a first switching period. One or more second power converters are connected in parallel with the first power converter and configured to convert a second input power to a second output power. The first output power and the second output power are provided to a load. At least one current sensor is positioned to sense first output current of the first output power, and the first feedback control circuit is configured to calculate a first metric based on the first sensed current at each of a plurality of first edges of each half switching period of the first switching period, and at intermediate points between each of the plurality of first edges. The first feedback control circuit is configured to adjust the first switching period based upon the first metric.

A method of controlling parallel power converters includes sensing a first output current of a first one of the parallel power converters as first edge sensed current, wherein the first one of the parallel power converters is controlled using pulse width modulation having a first switching period, and wherein the first edge sensed current is the first output current at each of a plurality of first edges of each half switching period of the first switching period; sensing the first output current of the first one of the parallel power converters as first intermediate sensed current at a point between each of the plurality of first edges; determining a first current metric based on the first edge sensed current and the first intermediate sensed current; and adjusting the first switching period based on the first current metric.

A method of controlling a plurality of parallel power converters configured to convert direct current power into one or more phase alternating power includes controlling a first one of the plurality of parallel power converters using a carrier wave to generate a first phase alternating current having a phase period on a first phase output; sampling the first phase alternating current on the first phase output at a plurality of edge points during the phase period; sampling the first phase alternating current on the first phase output at a plurality of intermediate points during the phase period different from the plurality of edge points; calculating a current metric by comparing the current sampled at the plurality of edge points to the current sampled at the plurality of intermediate points; and adjusting a frequency of the carrier wave based upon the current metric.

DETAILED DESCRIPTION

A system and method for synchronizing parallel power converters is disclosed herein that uses current sampling and feedback control to adjust a pulse width modulation (PWM) switching period. Each converter may be configured to convert a direct current (DC) input power into single- or multi-phase alternating current (AC) output power. For one or more output phase of each converter, current is sampled at both the edges and intermediate points of each half switching period. For each respective one or more output phases, current sampled at the edges of each half switching period are compared to the current sampled at the intermediate points to generate a current metric. The current metric(s) are used in a feedback control loop to adjust the switching period of the respective power converter so as to synchronize the parallel power converters.

Figure 1A:
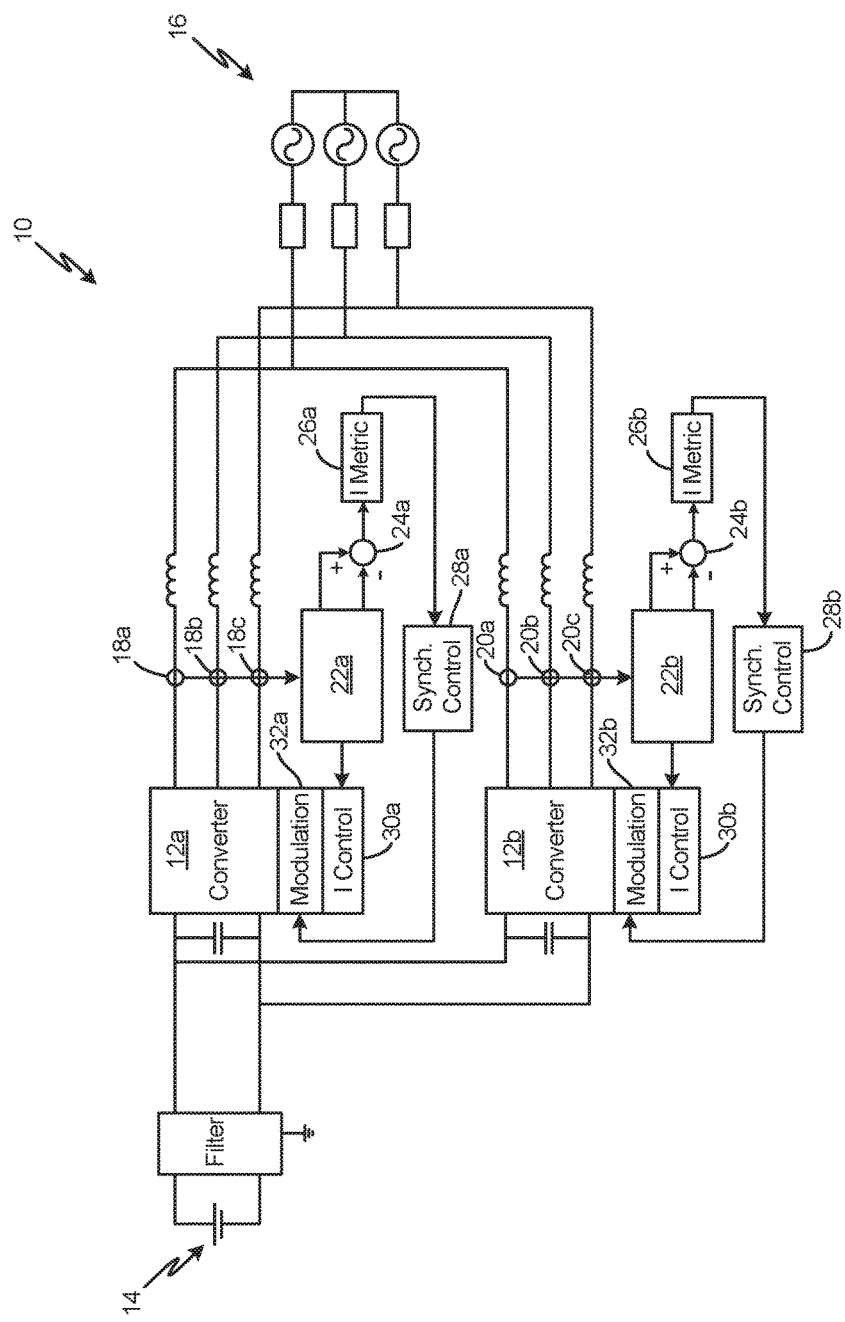
FIGS. 1A-1C are circuit diagrams illustrating parallel power converter systems with the synchronization feedback control circuits.
Figure 1B:
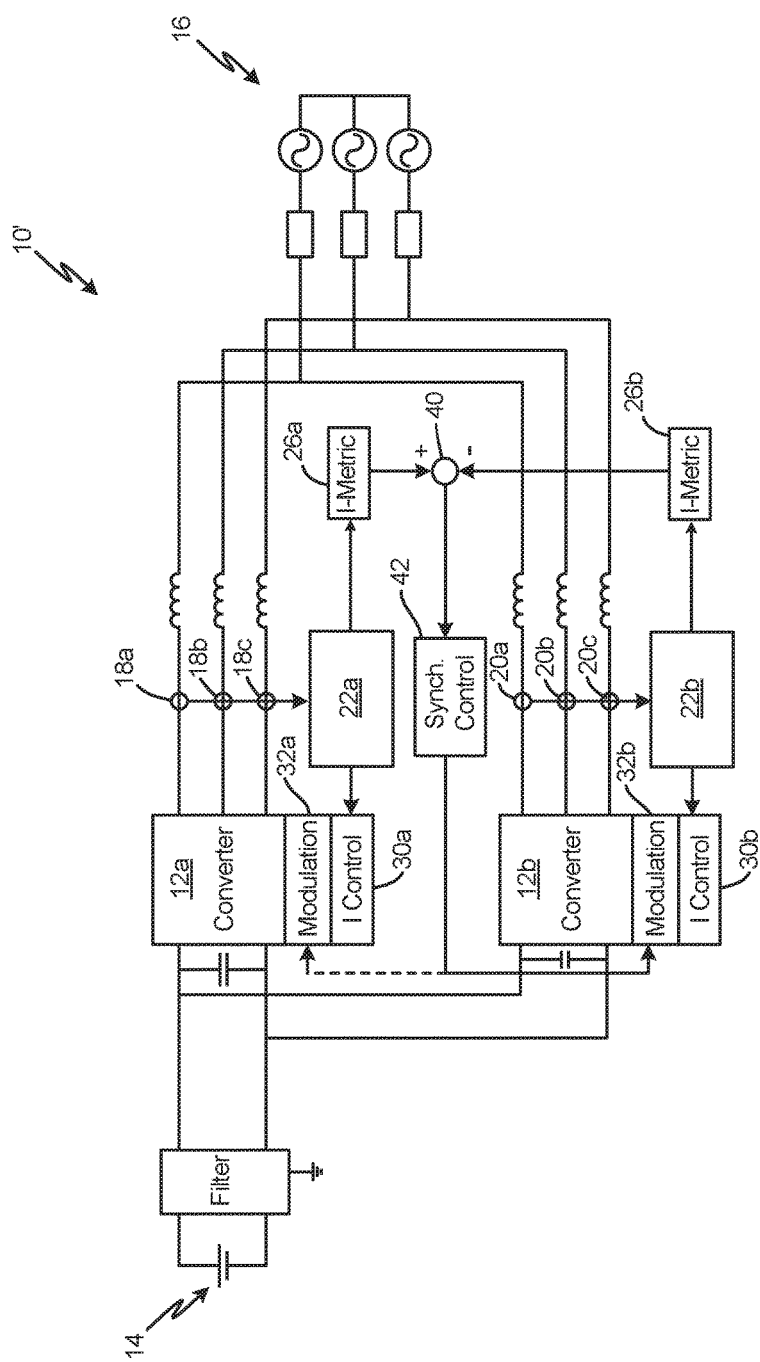
Figure 1C:
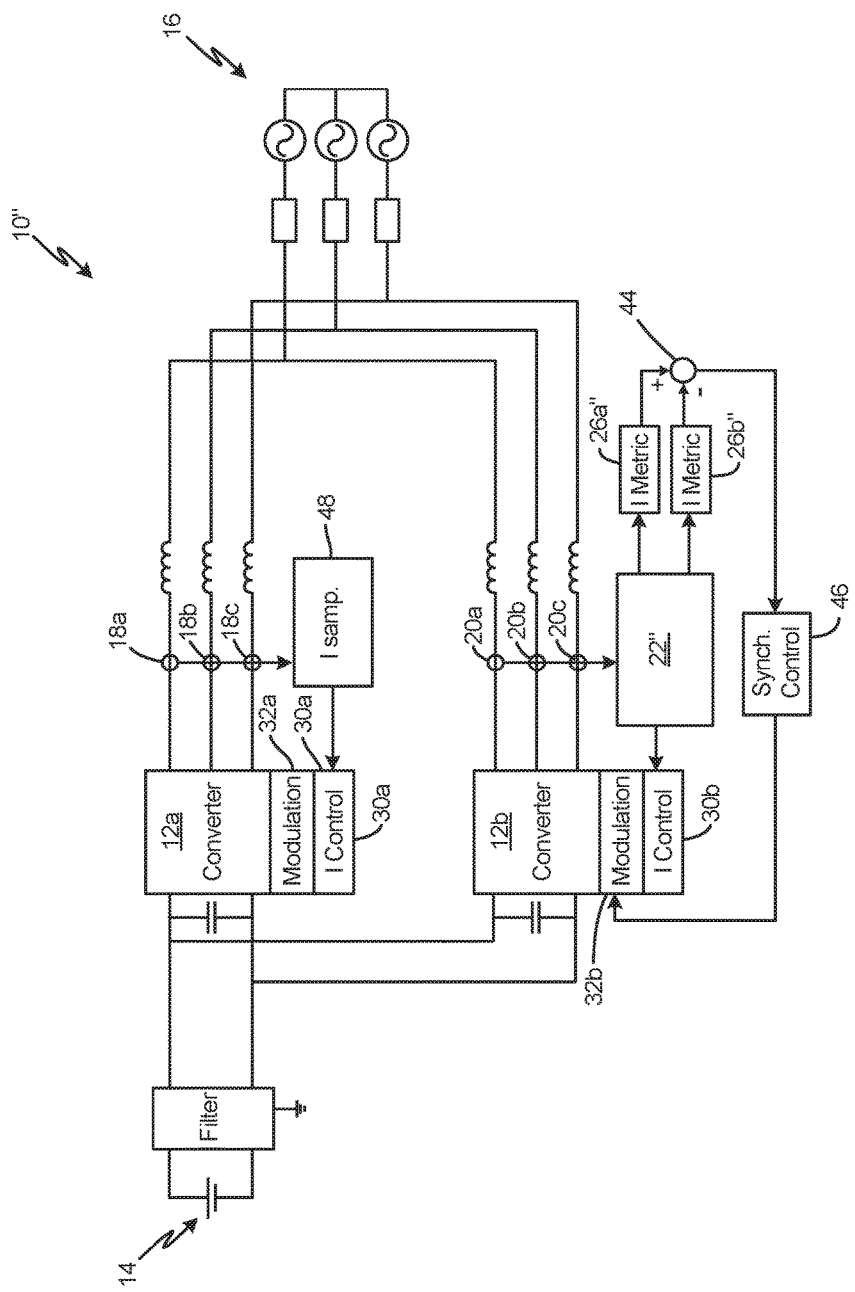

FIGS. 1A-1C are circuit diagrams illustrating parallel power converters 12a and 12b. FIG. 1A illustrates system 10 for controlling parallel power converters 12a and 12b. Synchronization of parallel power converters 12a and 12b is achieved in system 10 using separate feedback loops for each converter 12a and 12b. Parallel power converters 12a and 12b receive input power from direct current (DC) power source 14 and provide output power to load 16. While illustrated as a single DC power source 14, power converters 12a and 12b may receive DC input power from separate DC power sources. For example, system 10 may be part of an aircraft power system. Each power converter 12a and 12b may receive DC input power from separate respective aircraft power buses. In this case, although the current recirculation path is not complete on the DC side of power converters 12a and 12b, recirculation current can still be reduced among the phases on the output side of converters 12a and 12b, decreasing current distortion and lowering ripple current values.

While illustrated as two parallel power converters 12a and 12b, any number of power converters may be connected in parallel. Power converters 12a and 12b may be pulse width modulation (PWM) controlled inverters. For example, each power converter 12a and 12b may receive DC input power and convert the DC input power into single- or multi-phase AC output power by controlling switches of the inverter using PWM control signals. While illustrated in FIGS. 1A and 1B as DC to three-phase AC inverters, power converters 12a and 12b may be configured to produce any number of output phases from the DC input power.

Current is sampled at the output of power converter 12a by current sensors 18a-18c, and current is sampled at the output of power converter 12b by current sensors 20a-20c. Sensors 18a-18c are configured to provide sensed signals to current monitor circuit 22a and sensors 20a-20c are configured to provide sensed signals to current monitor circuit 22b. Current monitor circuits 22a and 22b provide sensed current outputs that correspond to one or more of the AC output phases to respective adders 24a and 24b. The output of adders 24a and 24b are provided to respective current metric circuits 26a and 26b, which calculate and provide a current metric to synchronization feedback circuits 28a and 28b.

Current monitor circuits 22a and 22b also provide the sensed current from sensors 18a-18c and 20a-20c to respective current controllers 30a and 30b. Synchronization feedback circuits 28a and 28b provide synchronization signals to PWM modulation control circuits 32a and 32b. Current controllers 30a and 30b, and PWM modulation control circuits 32a and 32b are configured to generate control signals for switches of converters 12a and 12b in order to generate the AC output power for each phase output.

Current monitor circuits 22a and 22b, adders 24a and 24b, current metric circuits 26a and 26b, and synchronization feedback circuits 28a and 28b form closed loop synchronization control loops for converters 12a and 12b. Each feedback loop is configured to capture the current recirculation on one or more phase outputs of each parallel power converter 12a and 12b by using additional current samples during each PWM switching period of the respective power converter 12a and 12b, explained in further detail below. The feedback synchronization control loop is configured to adjust the PWM switching period for each respective power converter 12a and 12b using a proportional gain, for example. This synchronizes the power converters 12a and 12b, minimizing current recirculation within system 10. Each feedback control loop also ensures good synchronization is achieved between power converters 12a and 12b even in cases of unexpected delay or other asymmetries that may exist within system 10.

In the embodiment illustrated in FIG. 1A, each power converter 12a and 12b contains its own feedback loop for synchronization, requiring no control communication between power converters 12a and 12b. This eliminates the need for power converters 12a and 12b to be colocated, and reduces complexity within system 10. Further, because each converter 12a and 12b performs its own local synchronization, any number of power converters may be connected in parallel and synchronized without greatly increasing the complexity of the system. While illustrated in FIG. 1A as sensing current on all output phases of each power converter 12a and 12b, synchronization can be achieved by each feedback control loop using sensed current from a single phase output of each respective power converter 12a and 12b. Also, while illustrated in FIGS. 1A-1C as including a single filter at power source 14, separate filters may be included at the input to each power converter 12a and 12b.

FIG. 1B illustrates system 10' for controlling parallel power converters 12a and 12b. Like-numbered components in FIG. 1B may operate in a partially similar manner to the respective components of system 10 shown in FIG. 1A. In system 10', the current metrics from current metric circuits 26a and 26b are provided to adder 40, which compares the current metrics between converters 12a and 12b to generate a difference that is provided to synchronization circuit 42. Synchronization circuit 42 generates a synchronization signal based on the difference between current metrics and provides the synchronization to one or both modulation control circuits 32a and 32b. One or both modulation control circuits 32a and 32b may adjust its respective PWM switching period to synchronize power converters 12a and 12b.

In the embodiment illustrated in FIG. 1B, only one of power converters 12a and 12b is required to adjust its respective PWM switching period. For example, as illustrated by the solid line in FIG. 1B between synchronization circuit 42 and modulation control circuit 32b, converter 12a may act as a "master" such that converter 12a holds its PWM switching period constant and converter 12b adjusts its PWM switching period in order to synchronize with converter 12a. A current metric, which is indicative of the recirculation current present in system 10', is computed for both converters 12a and 12b, and a synchronization signal is calculated based on a difference between the current metrics. Only converter 12b updates its PWM switching period using the synchronization signal to synchronize with converter 12a.

FIG. 1C illustrates system 10" for controlling parallel power converters 12a and 12b. In system 10", only one parallel converter 12b includes a synchronization feedback control loop. While illustrated as converter 12b, either converter 12a or 12b may be the converter that includes the synchronization feedback control loop while the other converter does not. While illustrated as two converters 12a and 12b, system 10" may include any number of parallel power converters. In systems with N parallel converters, N−1 converters may include synchronization feedback control loops while the other converter does not.

Power converter 12b includes a synchronization feedback control loop that includes current monitor circuit 22", current metric circuits 26a" and 26b", adder 44, and synchronization feedback circuit 46. Power converter 12a includes current sample circuit 48 that provides sampled current from the output phases of converter 12a to current controller 30a. In the embodiment illustrated in FIG. 1C, two current metric circuits 26a" and 26b" are included to determine two current metrics for converter 12b. For example, current metric circuit 26a" may determine a current metric for a first output phase of converter 12b and current metric circuit 26b" may determine a current metric for a second output phase of converter 12b. While illustrated as two current metrics, any number of current metrics may be determined for any one or more output phases of converter 12b. In the embodiment illustrated in FIG. 1C, the two current metrics are provided to adder 44 which determines a difference between the two current metrics. Synchronization feedback circuit 46 is provided the difference between the two current metrics and determines an adjustment to the PWM period for converter 12b.

In the embodiment illustrated in FIG. 1C, one of power converters 12a and 12b does not require a synchronization feedback control loop while system 10" still achieves synchronization between the parallel power converters. The embodiment illustrated in FIG. 1C also requires no control communication between power converters 12a and 12b, which, similar to FIG. 1A, eliminates the need for power converters 12a and 12b to be colocated, and reduces complexity within system 10". While multiple current metric circuits for a single power converter is illustrated only for the embodiment shown in FIG. 1C, any converter of any of the embodiments of FIGS. 1A-1C may include any number of current metric circuits. For example, a current metric may be determined for each output phase of a converter, and the individual current metrics may be compared to determine an overall metric for the converter.

With continued reference to FIGS. 1A-1C, FIGS. 2A and 2B are signal diagrams illustrating control and output signals for power converters 12a and 12b. Current 50 illustrates an example current that is present on one of the phase outputs of either power converter 12a or 12b. For example, when power converters 12a and 12b are out of synch, recirculation current will create undesirable ripple on current 50. Fundamental component 52 is the fundamental component, or first harmonic in the Fourier decomposition, for example, of current 50. Current monitor circuits 22a and 22b sample current 50 at sampling points 54 and 56. PWM signal 58 illustrates an example PWM control signal for the respective phase output.

In an example embodiment, the phase output line may be connected through a high switch to a positive DC rail when PWM signal 58 is high, and may be connected through a low switch to a negative DC rail when PWM signal 58 is low. In a first example switching period ($T_{SW}$), the low switch is enabled during time periods 60, and the high switch is enabled during time period 62. During a second example switching period ($T_{SW}$), the low switch is enabled during time periods 64, and the high switch is enabled during time period 66. This is continued for each switching period ($T_{SW}$).

In prior art systems, current was most commonly sampled at points 54 at the edges of each half switching period ($T_{SW}/2$). This was to ensure that any ripple on the signal was minimal when sampled, so that the sample current was as indicative of the desired output current as possible. The sampled current was provided as feedback for PWM control schemes. This type of feedback control is not affected by the synchronization performed by systems 10 and 10'. As illustrated in FIGS. 1A and 1B, feedback for the PWM control is still accomplished through current monitor circuits 22a and 22b, which pass the current sampled at points 54 at the edges of the half switching period ($T_{SW}/2$) back to the PWM current control circuits 30a and 30b.

Figure 3:
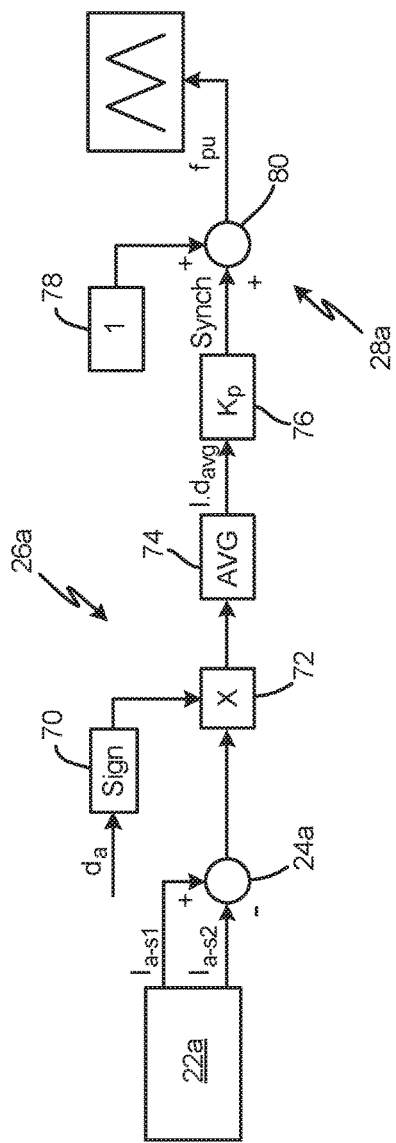
FIG. 3 is a block diagram illustrating an embodiment of a control circuit for synchronizing parallel power converters.

The current metric calculated in current metric circuits 26a and 26b is an indication of recirculation current and is based on the difference between the current sampled at points 54 and 56. In one embodiment, the current metric may be a root mean square (RMS) value of the difference between current sampled at points 54 and 56. In another embodiment, an RMS value may be determined for both points 54 and 56, and then a difference between RMS values may be determined. Any desirable period may be employed over which to calculate an RMS value. For example, the RMS value may be calculated using a rolling window equal to the period of signal 52 on the respective output phase. In another embodiment, and as illustrated in FIG. 3, the current metric may be an average of the difference between the current at points 54 and 56 multiplied by a sign of the duty cycle of the respective output phase. In other embodiments, other metrics that are indicative of the difference in current between points 54 and 56 may be employed.

Figure 2A:
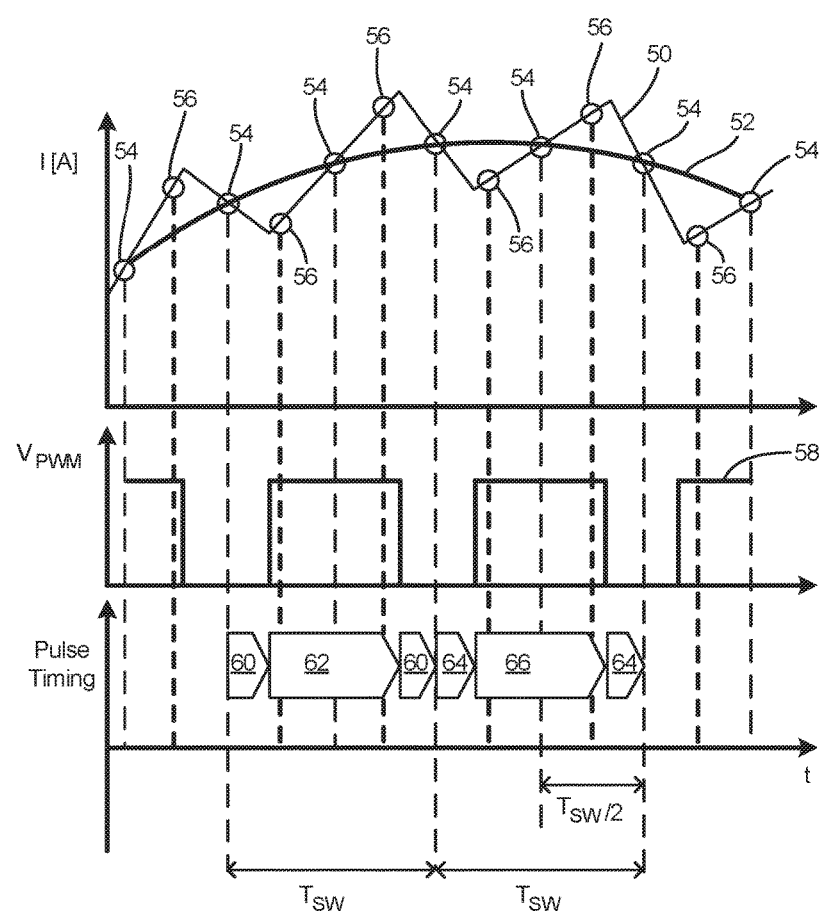
FIGS. 2A and 2B are signal diagrams illustrating control and output signals of a paralleled power converter.
Figure 2B:
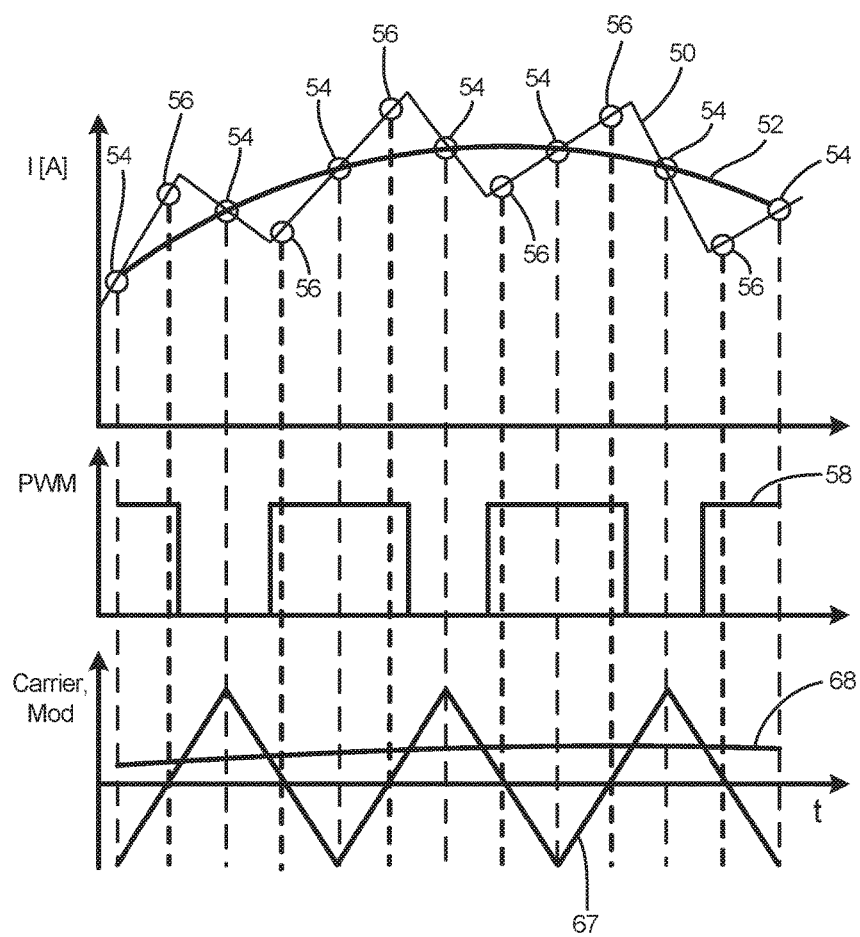

There are many methods in which PWM signal 58 may be generated. In one example, as illustrated in FIG. 2B, PWM signal 58 is generated using a triangle carrier wave 67 and a modulation signal 68. Current is sampled at sampling points 54 at the "edges" of carrier wave 67. The edges of carrier wave 67 may be the upper and lower bounds of the signal. For example, if carrier wave 67 is a triangular carrier wave (as shown in FIG. 2B), the edges of carrier wave 67 may be the peaks (upper bounds) and troughs (lower bounds) of carrier wave 67. Current is also sampled at intermediate points 56 between the edges of carrier wave 67. As described above, this is done to sense the current when distortion created by recirculation current components is likely to be present on phase output current 50. In the embodiment illustrated in FIG. 2B, intermediate points 56 are sampled exactly halfway between the upper and lower bounds of carrier wave 67. In other embodiments, intermediate points 56 may be sampled at other points between the upper and lower bounds of carrier wave 67. In this embodiment, the PWM switching period can be adjusted by adjusting a frequency of carrier wave 67.

FIG. 3 is a block diagram illustrating an embodiment of a feedback control loop that includes current monitor circuit 22a, adder circuit 24a, current metric circuit 26a, and synchronization circuit 28a. The feedback control loop may be implemented integral to an already existing control circuit for the respective power converter 12a or 12b (FIG. 1A), or may be implemented as one or more standalone circuits. While described with reference to a adjusting a frequency of a carrier wave, the circuit illustrated in FIG. 3 may be used to adjust a PWM switching period in any way.

Current metric circuit 26a includes sign block 70 which is configured to receive a duty cycle input $d_a$, and output a signal indicative of a sign of the duty cycle for the respective phase output to multiplication block 72. The output of multiplication block 72 is averaged over time by average block 74 to obtain $I.d_{avg}$, which is the current metric determined for the respective power converter 12a or 12b (FIG. 1A). Synchronization circuit 28a includes gain circuit 76, unit block 78, and adder 80. Gain circuit 76 is configured to output a desired gain of the current metric, which is added to the output of unit block 78 by adder 80. The output of adder 80 is a frequency update signal $f_{pu}$, which is provided to modulation control circuit 32a. The frequency update signal $f_{pu}$ is used to adjust the frequency of the carrier wave used in the PWM control of power converter 12a.

As an example embodiment, DC power is received by a paralleled power converter from a DC power source. PWM signals are generated to control switches of the paralleled power converter in order to generate three-phase power for a load. The PWM signals are generated based in part on a carrier wave signal. A current sensor senses current on at least one of the phase outputs of the paralleled converter and provides the sensed signal to current monitor circuit 22a. Current monitor circuit 22a samples the sensed current both at the edge points and the intermediate points of the carrier wave.

Signal $I_{a-s1}$ represents the sensed current at the intermediate points and signal $T_{a-s2}$ represents the sensed current at the edge points. The difference between the two sampled currents is multiplied by a sign of the duty cycle of the respective phase, illustrated by signal $d_a$ and sign block 70. The difference in current, adjusted for the duty cycle, is then averaged by average block 74. The average may be a rolling average over any desired time frame. For example, the average may be an average over the period of the output signal on the respective phase output. The output of average block 74 ($I.d_{avg}$), is the current metric.

The current metric ($I.d_{avg}$) is then used to calculate a synchronization signal. In the embodiment illustrated in FIG. 1A, this is calculated for each parallel power converter. In the embodiment illustrated in FIG. 1B, the current metrics ($I.d_{avg}$) from each converter are compared, and a single synchronization signal is calculated based on a difference in the respective current metrics ($I.d_{avg}$).

In the embodiment illustrated in FIG. 3, a proportional (P) control is used for the synchronization signal generation. In other embodiments, synchronization feedback circuit 28a (FIG. 1A) and/or synchronization circuit 42 (FIG. 1B) may implement other control schemes, such as proportional-integral (PI) control. The current metric (I.d$_{avg}$), which is an indication of the recirculation current present on the respective phase output, is applied to the gain (K$_p$) block 76, which implements the proportional control for the feedback loop. The output of gain block 76 is indicative of an adjustment in frequency that must be made for the respective carrier wave signal. In systems that do not utilize carrier waves, the output of gain block 76 is some other signal indicative of an update to the PWM switching period. Unit block 78 is added to the difference such that f$_{pu}$ is 1 if the frequency should stay the same, less than 1 if the frequency should be reduced, and greater than 1 if the frequency should be increased. By synchronizing parallel power converters in this way, recirculation current can be minimized without greatly increasing the cost and complexity of the converter system.

DISCUSSION OF POSSIBLE EMBODIMENTS

A system includes first and second power converters, at least one current sensor, and a first feedback control circuit. The first power converter is configured to convert a first input power to a first output power, and is controlled using pulse width modulation having a first switching period. One or more second power converter is connected in parallel with the first power converter and configured to convert a second input power to a second output power. The first output power and the second output power are provided to a load. The at least one current sensor is positioned to sense first output current of the first output power, and the first feedback control circuit is configured to calculate a first metric based on the first sensed current at each of a plurality of first edges of each half switching period of the first switching period, and at intermediate points between each of the plurality of first edges. The first feedback control circuit is configured to adjust the first switching period based upon the first metric.

The system of the preceding paragraph can optionally include, additionally and/or alternatively, any one or more of the following features, configurations and/or additional components:

A further embodiment of the foregoing system, wherein the first power converter is further controlled using a first carrier wave, and wherein the plurality of first edges are upper and lower bounds of the first carrier wave.

A further embodiment of any of the foregoing systems, wherein one of the one or more second power converters is controlled using pulse width modulation having a second switching period, and wherein the system further includes at least one second current sensor positioned to sense second output current of the second output power; a second feedback control circuit configured to calculate a second metric based on the second sensed current at each of a plurality of second edges of each half switching period of the second switching period, and at intermediate points between each of the plurality of second edges.

A further embodiment of any of the foregoing systems, wherein the second feedback control circuit is configured to adjust the second switching period based upon the second metric.

A further embodiment of any of the foregoing systems, wherein the first metric is based further upon an average of a sign of a duty cycle of the pulse width modulation of the first output current multiplied by the difference between the first sensed current at each of the plurality of first edges and the intermediate points between each of the plurality of first edges.

A further embodiment of any of the foregoing systems, wherein the first current metric is a root mean square of the difference between the first sensed current at each of the plurality of first edges and the intermediate points between each of the plurality of first edges.

A further embodiment of any of the foregoing systems, wherein the first feedback control circuit employs a proportional gain for adjusting the first switching period.

A further embodiment of any of the foregoing systems, further including a synchronization circuit configured to calculate a metric difference between the first metric and the second metric, and wherein the first feedback control circuit is configured to adjust the first or the second switching period based further upon the metric difference.

A further embodiment of any of the foregoing systems, wherein the first current metric is a root mean square of the first sensed current at each of the plurality of intermediate points between each of the plurality of first edges and the second metric is a root mean square of the second current sampled at the intermediate points between each of the plurality of second edges.

A further embodiment of any of the foregoing systems, wherein the first current metric is based upon an average of the first sensed current at each of the intermediate points between each of the plurality of first edges and the second metric is an average of the second current sampled at the intermediate points between each of the plurality of second edges.

A further embodiment of any of the foregoing systems, wherein the first input power is direct current power and wherein the first output power is three-phase alternating current power having three output phases.

A further embodiment of any of the foregoing systems, wherein the first feedback control circuit is configured to calculate the first metric based on the first sensed current of only one of the three output phases.

A further embodiment of any of the foregoing systems, wherein the first input power is direct current power and the first output power is single-phase alternating current power.

A method of controlling parallel power converters includes sensing a first output current of a first one of the parallel power converters as first edge sensed current, wherein the first one of the parallel power converters is controlled using pulse width modulation having a first switching period, and wherein the first edge sensed current is the first output current at each of a plurality of first edges of each half switching period of the first switching period; sensing the first output current of the first one of the parallel power converters as first intermediate sensed current at a point between each of the plurality of first edges; determining a first current metric based on the first edge sensed current and the first intermediate sensed current; and adjusting the first switching period based on the first current metric.

The method of the preceding paragraph can optionally include, additionally and/or alternatively, any one or more of the following features, configurations and/or additional components:

A further embodiment of the foregoing method, further includes sensing a second output current of a second one of the parallel power converters as second edge sensed, wherein the second one of the parallel power converters is controlled using pulse width modulation having a second switching period, and wherein the second edge sensed current is the second output current at each of a plurality of second edges of each half switching period of the second switching period; sensing the second output current of the second one of the parallel power converters as second intermediate sensed current at a point between each of the plurality of second edges; and determining a second current metric based on the second edge sensed current and the second intermediate sensed current.

A further embodiment of any of the foregoing methods, further includes adjusting the second switching period based on the second current metric.

A further embodiment of any of the foregoing methods, wherein adjusting the first and second switching periods includes generating a first synchronization signal based on the first current metric; providing the first synchronization signal to the first one of the plurality of parallel converters; adjusting the first switching period using the first synchronization signal; generating a second synchronization signal based on the second current metric; providing the second synchronization signal to the second one of the plurality of parallel converters; and adjusting the second switching period using the second synchronization signal.

A further embodiment of any of the foregoing methods, wherein adjusting the first switching period based on the first current metric includes calculating a metric difference between the first current metric and the second current metric; and adjusting the first switching period based on the metric difference.

A further embodiment of any of the foregoing methods, wherein determining the first current metric based on the first edge sensed current and the first intermediate sensed current includes calculating a difference between the first edge sensed current and the first intermediate sensed current; multiplying the difference by a sign of a duty cycle of the pulse width modulation of the first output current to obtain a multiplied output; and determining an average of the multiplied output over a period of the output current to obtain the first current metric.

A method of controlling a plurality of parallel power converters configured to convert direct current power into one or more phase alternating power includes controlling a first one of the plurality of parallel power converters using a carrier wave to generate a first phase alternating current having a phase period on a first phase output; sampling the first phase alternating current on the first phase output at a plurality of edge points during the phase period; sampling the first phase alternating current on the first phase output at a plurality of intermediate points during the phase period different from the plurality of edge points; calculating a current metric by comparing the current sampled at the plurality of edge points to the current sampled at the plurality of intermediate points; and adjusting a frequency of the carrier wave based upon the current metric.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system comprising:
a first power converter configured to convert a first input power to a first output power, wherein the first power converter is controlled using pulse width modulation having a first switching period;
one or more second power converters connected in parallel with the first power converter and configured to convert a second input power to a second output power, wherein the first output power and the second output power are provided to a load;
at least one current sensor positioned to sense first output current of the first output power; and
a first feedback control circuit configured to calculate a first metric based on the first sensed current at each of a plurality of first edges of each half switching period of the first switching period, and at an intermediate point between each of the plurality of first edges;
wherein the first feedback control circuit is configured to adjust the first switching period based upon the first metric and the first power converter is further controlled using a first carrier wave, and wherein the plurality of first edges are upper and lower bounds of the first carrier wave.

2. The system of claim 1, wherein one of the one or more second power converters is controlled using pulse width modulation having a second switching period, and wherein the system further comprises:
at least one second current sensor positioned to sense second output current of the second output power; and
a second feedback control circuit configured to calculate a second metric based on the second sensed current at each of a plurality of second edges of each half switching period of the second switching period, and at intermediate points between each of the plurality of second edges.

3. The system of claim 2, wherein the second feedback control circuit is configured to adjust the second switching period based upon the second metric.

4. The system of claim 3, wherein the first metric is based further upon an average of a sign of a duty cycle of the pulse width modulation of the first output current multiplied by the difference between the first sensed current at each of the plurality of first edges and the intermediate points between each of the plurality of first edges.

5. The system of claim 3, wherein the first current metric is a root mean square of the difference between the first sensed current at each of the plurality of first edges and the intermediate points between each of the plurality of first edges.

6. The system of claim 3, wherein the first feedback control circuit employs a proportional gain for adjusting the first switching period.

7. The system of claim 2, further comprising:
a synchronization circuit configured to calculate a metric difference between the first metric and the second metric, and wherein the first feedback control circuit is configured to adjust the first or the second switching period based further upon the metric difference.

8. The system of claim 7, wherein the first current metric is a root mean square of the first sensed current at each of the plurality of intermediate points between each of the plurality of first edges and the second metric is a root mean square of the second current sampled at the intermediate points between each of the plurality of second edges.

9. The system of claim 7, wherein the first current metric is based upon an average of the first sensed current at each of the intermediate points between each of the plurality of first edges and the second metric is an average of the second current sampled at the intermediate points between each of the plurality of second edges.

10. The system of claim 1, wherein the first input power is direct current power and wherein the first output power is three-phase alternating current power having three output phases.

11. The system of claim 10, wherein the first feedback control circuit is configured to calculate the first metric based on the first sensed current of only one of the three output phases.

12. The system of claim 1, wherein the first input power is direct current power and the first output power is single-phase alternating current power.

13. A method of controlling parallel power converters, the method comprising:

sensing a first output current of a first one of the parallel power converters as first edge sensed current, wherein the first one of the parallel power converters is controlled using pulse width modulation generated using a carrier wave and having a first switching period, and wherein the first edge sensed current is the first output current at each of a plurality of first edges of each half switching period of the first switching period, wherein the plurality of first edges are upper and lower bounds of the carrier wave;

sensing the first output current of the first one of the parallel power converters as first intermediate sensed current at a point between each of the plurality of first edges;

determining a first current metric based on the first edge sensed current and the first intermediate sensed current; and adjusting the first switching period based on the first current metric.

14. The method of claim 13, further comprising:

sensing a second output current of a second one of the parallel power converters as second edge sensed, wherein the second one of the parallel power converters is controlled using pulse width modulation having a second switching period, and wherein the second edge sensed current is the second output current at each of a plurality of second edges of each half switching period of the second switching period;

sensing the second output current of the second one of the parallel power converters as second intermediate sensed current at a point between each of the plurality of second edges; and determining a second current metric based on the second edge sensed current and the second intermediate sensed current.

15. The method of claim 14, further comprising adjusting the second switching period based on the second current metric.

16. The method of claim 15, wherein adjusting the first and second switching periods comprises:

generating a first synchronization signal based on the first current metric;

providing the first synchronization signal to the first one of the plurality of parallel converters;

adjusting the first switching period using the first synchronization signal;

generating a second synchronization signal based on the second current metric;

providing the second synchronization signal to the second one of the plurality of parallel converters; and adjusting the second switching period using the second synchronization signal.

17. The method of claim 14, wherein adjusting the first switching period based on the first current metric comprises:

calculating a metric difference between the first current metric and the second current metric; and adjusting the first switching period based on the metric difference.

18. The method of claim 13, wherein determining the first current metric based on the first edge sensed current and the first intermediate sensed current comprises:

calculating a difference between the first edge sensed current and the first intermediate sensed current;

multiplying the difference by a sign of a duty cycle of the pulse width modulation of the first output current to obtain a multiplied output; and determining an average of the multiplied output over a period of the output current to obtain the first current metric.

19. A method of controlling a plurality of parallel power converters configured to convert direct current power into one or more phase alternating power, the method comprising:

controlling a first one of the plurality of parallel power converters using a carrier wave to generate a first phase alternating current having a phase period on a first phase output;

sampling the first phase alternating current on the first phase output at a plurality of edge points during the phase period, wherein the plurality of edge points are upper and lower bounds of the carrier wave;

sampling the first phase alternating current on the first phase output at an intermediate point during the phase period different from each of the plurality of edge points;

calculating a current metric by comparing the current sampled at the plurality of edge points to the current sampled at the plurality of intermediate points; and adjusting a frequency of the carrier wave based upon the current metric.

* * * * *